RING COUNTERS EMPLOYING THRESHOLD GATES

Filed Jan. 31, 1967

Inventor:
ROBERT O. WINDER

By Samuel Cohen

Attorney

United States Patent Office 3,434,058

Patented Mar. 18, 1969

3,434,058

RING COUNTERS EMPLOYING THRESHOLD GATES

Robert O. Winder, Trenton, N.J., assignor to Radio Corporation of America, a corporation of Delaware

Filed Jan. 31, 1967, Ser. No. 612,840

U.S. Cl. 328—43 9 Claims

Int. Cl. H03k *23/02, 21/00*

ABSTRACT OF THE DISCLOSURE

The ring counters of the invention include an odd number of threshold gates, one more than the number of pulses they count. Each gate receives as one input its own output signal, as a second input the signals indicative of the bits to be counted, and as a third input an output signal from the preceding gate in the ring. One of the gates in the counter receives, in addition to all of these inputs, an output signal from the third gate preceding it in the ring.

DESCRIPTION OF THE PRIOR ART

J. E. Price, in an article appearing in the IEEE Transactions on Electronic Computers, April 1965, pp. 256–260, describes a family of majority gate ring counters for counting odd numbers of input pulses (for counting to an odd base $2n-1$). These counters, in other words, for an odd number $2n-1$ of successive input pulses, cycle through a number of successive circuit states and for the following same odd number of input pulses, again cycle through their successive states. These counters employ $2n-1$ majority gates to count to the base $2n-1$, and each change in circuit state is accomplished in one majority gate delay interval.

Price also tells how the counters above may be modified to count even numbers of input pulses (to count to an even base). However, such modification requires the addition of an AND gate effectively in series with one of the majority gates. Because of this, in the worst case two gate delays are required for a transition from one circuit state to a following circuit state and the speed of the counter is reduced, as a practical matter, to one-half that of the odd number of pulse counters.

P. Misiurewicz, in a letter to the IEEE Transactions on Electronic Computers, April 1966, p. 262, describes a majority gate ring counter for counting even numbers $2n$ of input pulses (for counting to an even base $2n$). This counter does appear to be capable of operating at relatively high speed, however, it is difficult or impossible to reset. As a matter of fact, neither Price nor Misiurewicz suggest any way in which their ring counters may be reset.

SUMMARY OF THE INVENTION

The present invention is an improved form of the circuit described by Price which is suitable for counting even numbers of input pulses without any sacrifice in circuit speed and which is capable of readily being reset.

The ring counters of the invention include an odd number of threshold gates, one more than the number of pulses they count. Each gate receives as one input its own output signal, as a second input the signals indicative of the bits to be counted, and as a third input an output signal from the preceding gate in the ring. One of the gates in the counter receives, in addition to all of these inputs, an output signal from the third gate preceding it in the ring.

In the ring counters of the invention, in the particular transitions when it is necessary for two of the gates to change their state, they do so concurrently rather than serially and therefore no time is lost in the operation of the counter.

DETAILED DESCRIPTION

The gates of the various figures receive electrical signals which represent binary digits (bits) as inputs and produce electrical signals which represent binary digits as outputs. To simplify the discussion which follows, the bits themselves are sometimes referred to rather than the signals which represent the bits. The small letters represent present values of bits and the capital letters new values of bits which occur in response to changing input conditions.

The threshold gates shown in the various figures are in themselves known. The numbers within the gate indicate the respective weights accorded the inputs. Thus, in FIGURE 1 a threshold gate such as 10 is a simple 3-input majority gate (each input has the weight 1) with both normal and complementary outputs. This type of gate is also known as a "majority-minority" gate. If two or more inputs represent the bit 1, $Z_1=1$ and $\overline{Z}_1=0$. If two or more of the inputs represent the bit 0, $Z_1=0$ and $\overline{Z}_1=1$. A gate such as 15 of FIGURE 2 has five inputs with respective input weights 1, 2, 2, 1, 1 and has a threshold of 4. Thus, if four or more of the seven input weights represent the bit 1 (for example if $R=1$), $Z_1=1$ and $\overline{Z}_1=0$. Weighted input gates of the type shown in FIGURE 2 and circuits for implementing them are described in copending application Ser. No. 547,943, filed May 5, 1966 by the present applicant, and assigned to the same assignee as the present application.

Figure 1:
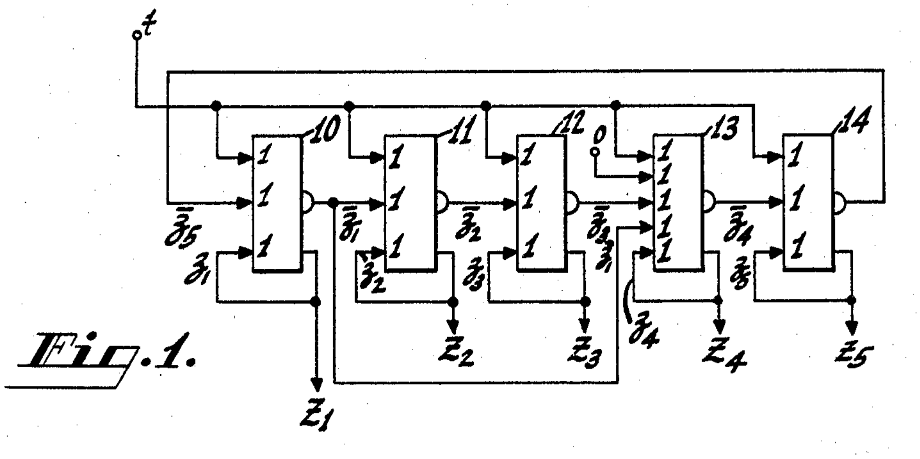
FIGURE 1 is a block diagram of one form of ring counter according to the invention.

The ring counter of FIGURE 1 includes five gates 10–14, respectively. Gates 10, 11, 12 and 14 are 3-input majority gates having both normal and complementary outputs and are logically identical with the gates shown in the Price article. Gate 13, however, is a 5-input majority-minority gate which receives as a fourth input $\overline{z}_1$, the complementary output of the first gate 10, and which receives as its fifth input a constant bias 0.

The operation of the circuit of FIGURE 1 is succinctly desribed in the following five Boolean equations.

$$Z_1=Maj(z_1,\overline{z}_5,t) \quad (1)$$

$$Z_2=Maj(\overline{z}_1,z_2,t) \quad (2)$$

$$Z_3=Maj(\overline{z}_2,z_3,t) \quad (3)$$

$$Z_4=\overline{z}_1\overline{z}_3z_4+t\cdot Maj(\overline{z}_1,\overline{z}_3,z_4) \quad (4)$$

$$Z_5=Maj(\overline{z}_4,z_5,t) \quad (5)$$

The operation of the gate is also given in the sequential switching table or "map" below. In this table the present circuit states are shown in the leftmost column, the value of $t$ is shown in the upper row and the next circuit states are shown in the body of the table. When the next circuit state is equal to the present circuit state, the counter is in a stable condition and this is indicated in the table by a plus sign.

TABLE I

| $t$ / $z_1z_2z_3z_4z_5$ | 0 | 1 | |
|---|---|---|---|
| 01010 | 01010+ | 11010 | $Z_1Z_2Z_3Z_4Z_5$ |
| 11010 | 10000 | 11010+ | |
| 10000 | 10000+ | 10101 | |
| 10101 | 00101 | 10101+ | |
| 00101 | 00101+ | 01101 | |
| 01101 | 01001 | 01101+ | |
| 01001 | 01001+ | 01011 | |
| 01011 | 01010 | 01011+ | |
| 01010 | 01010+ | 11010 | |

To aid the reader to follow the circuit operation, a few examples of the signal flow will be traced. Assume first that the circuit is storing 01010 and that $t=0$. As $t=0$ and $z_1=0$, $Z_1=0$ since at least two of the three inputs to gate 10 are 0. As $\bar{z}_1=1$ and $z_2=1$, $Z_2=1$ since two of the three inputs to gate 11 are 1. As $\bar{z}_2$ and $z_3$ both equal 0, $Z_3=0$ since at least two of the three inputs to gate 12 are 0. As $\bar{z}_1$, $\bar{z}_3$ and $z_4$ all equal 1, $Z_4=1$ as three of the five input weights to gate 13 are 1. As $\bar{z}_4$ and $t$ equal 0, $Z_5$, the output of gate 14 is equal to 0. Thus, the circuit is in a stable state and the output produced is as indicated in line 1 of the table.

When $t$ changes to 1, as $\bar{z}_5$ is also 1, two of the three inputs to gate 10 are 1 and $Z_1$ becomes 1. As $z_2$ and $t$ are both equal to 1, gate 11 produces an output $Z_2=1$. As $\bar{z}_2$ and $z_3$ are both 0, gate 12 produces an output $z_3=0$. As $z_4$, $\bar{z}_3$ and $t$ are all 1, gate 13 produces an output $z_4=1$. As $z_5$ and $\bar{z}_4$ are both 0, gate 14 produces an output $Z_5=0$. As can be seen from line 2 within the body of the map, this circuit state 11010 is a stable circuit state.

Note that in two of the transitions from one circuit state to another, two gates change their state. However, such changes occur concurrently rather than sequentially so that no time is lost in the operation of the counter. Furthermore, the design is such that no race conditions exist.

It may be observed from the map that after 8 input pulses, the circuit begins again to cycle through the same sequence of circuit states. In other words, line 9 of the table is the same as line 1. If there were a line 10 in the table, it would be the same as line 2 and so on. Thus, in response to 4 trigger pulse periods, that is, in response to 4 sequential periods during each of which $t$ changes from 0 to 1, eight different circuit states occur. There are two different states each pulse period, one corresponding to $t=0$ and the other corresponding to $t=1$. A decoder may be employed, as suggested by Price, to decode the eight numbers representing the eight states or, if desired, to decode the four numbers corresponding to four successive intervals during which $t=1$. Also, the output of any one gate can be used to "trigger" another similar ring counter, forming a counter in the base 4.

Figure 2:
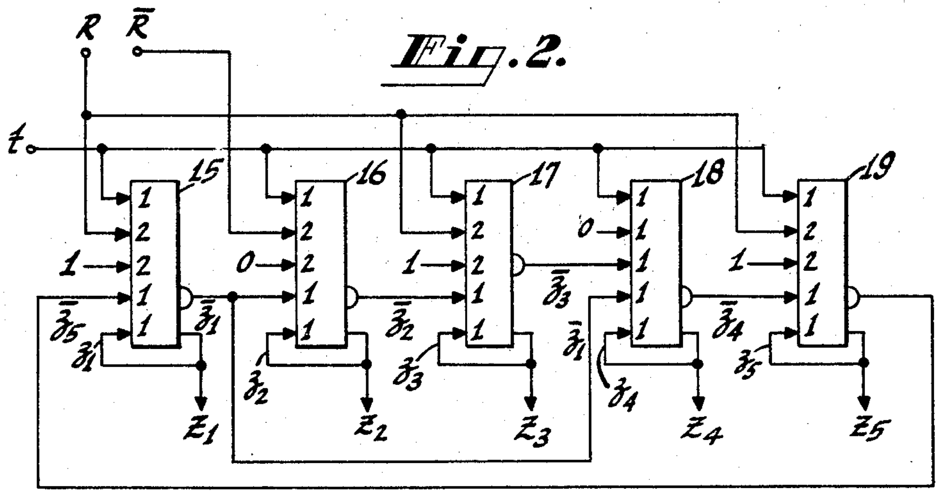
FIGURE 2 is a block diagram of a second form of ring counter according to the invention.

A modified form of the invention is shown in FIGURE 2. This ring counter includes five stages 15–19. Stage 18 is a 5-input majority-minority gate whereas the remaining four stages are weighted input threshold gates each having 5 inputs with respective weights 1, 2, 2, 1, 1 and with a threshold of 4. During normal operation, $R=0$ and $\bar{R}=1$. At gates 15, 17 and 19 the $R=0$ input exactly cancels the bias=1 input so that these three gates operate as 3-input majority-minority gates corresponding to gate 10, 12 and 14 of FIGURE 1. At gate 16, the $\bar{R}=1$ input exactly cancels the bias=0 input so that this gate operates in exactly the same manner as the majority-minority gate 11 of FIGURE 1. Gate 18 is identical to gate 13 of FIGURE 1 and operates in the same way as gate 13. Thus, when $R=0$ and $\bar{R}=1$, the circuit of FIGURE 2 operates in exactly the same way as the circuit of FIGURE 1.

When it is desired to reset the circuit of FIGURE 2, R is changed to 1 and $\bar{R}$ is changed to 0. When R is changed to 1, four of the seven input weights to gates 15, 17 and 19 represent the bit 1 so that $Z_1$, $Z_3$ and $Z_5$ become 1 regardless of the values of the other inputs to gates 15, 17 and 19. In a similar manner, four of the seven input weights to gate 16 represent the bit 0 so that $Z_2$ becomes 0. It is not necessary to apply a reset pulse to gate 18 as it already has a bias of 0 applied to one input lead and $\bar{z}_1$ and $\bar{z}_3$ are also 0 so that $Z_4$ must change to 0 if it is not already 0. Thus, the counter has been forced into the stable state 10101 shown in row 4 of Table I above, regardless of what state it had been in previously. When the values $R=0$ and $\bar{R}=1$ are again applied, the counter will begin to count from this starting point (10101).

Figure 3:
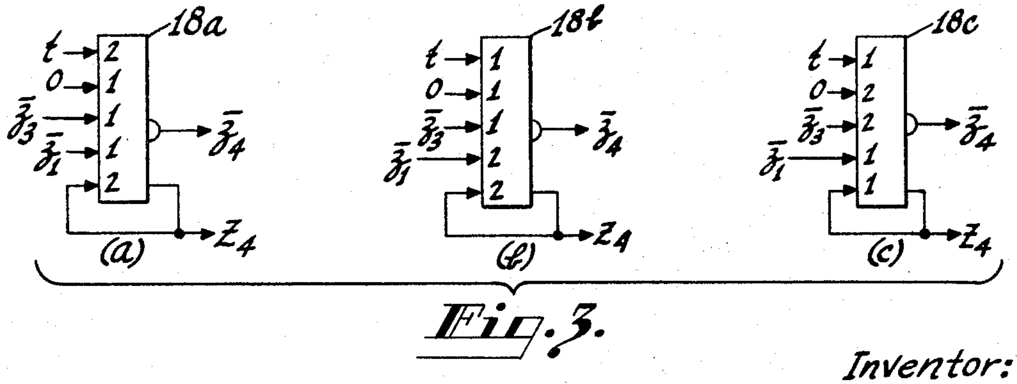
FIGURE 3 (*a–c*) are block diagrams of modified stages for the circuit of FIGURE 2.

It is often desirable in the interest of effecting economies to use all identical circuit elements in the design of a ring counter or other logic circuit. It is possible to do this in the circuit of FIGURE 2 by substituting for the element 18, by way of example, one of the elements 18*a*, 18*b* or 18*c* connected as shown in FIGURES 3*a*–3*b*, respectively (other substitutions are also possible). Although none of these elements are identical to element 18, they all do operate in exactly the same way as element 18 in the environment of FIGURE 2 since for the various possible permutations of inputs they can receive, their outputs are logically the same as that of element 18, as is shown in Table II below.

TABLE II

| $z_j$ | $\bar{z}_{(j\ominus 1)}$ | $t$ | $\bar{z}_{(j\ominus 3)}$ | $Z_j$ |
|---|---|---|---|---|
| 0 | 1 | 0 | 1 | 0 |
| 0 | 1 | 0 | 0 | 0 |
| 0 | 1 | 1 | 1 | 1 |
| 0 | 1 | 1 | 0 | 0 |
| 0 | 0 | 0 | 1 | 0 |
| 0 | 0 | 0 | 0 | 0 |
| 0 | 0 | 1 | 1 | 0 |
| 0 | 0 | 1 | 0 | 0 |
| 1 | 1 | 0 | 1 | 1 |
| 1 | 1 | 0 | 0 | 0 |
| 1 | 1 | 1 | 1 | 1 |
| 1 | 1 | 1 | 0 | 1 |

In Table II above, the gate of interest (one of 18, 18*a*, 18*b* and 18*c*) is defined as the $j$'th gate, where j is a particular number from 1 to $n+1$ (since this is a ring counter, $j$ may occur anywhere), $n$ is the counting base, $z_j$ is the input from the $j$'th stage, $\bar{z}_{(j\ominus 1)}$ is the input from the $j\ominus 1$'th stage and $\bar{z}_{(j\ominus 3)}$ is the input from the $j\ominus 3$'rd stage. Also, $\ominus$ represents modulo $n+1$ subtraction, where $n$ is even. To illustrate, the first stage in FIGURE 1 receives the complementary output of the fifth stage since in the case in which $n+1=5$ and in which there are five digits 1 through 5 and in which $i=1$, $i\ominus 1=5$. Similarly, in the circuit of FIGURE 1, $j=4$ and $j\ominus 3=1$.

While the invention has been illustrated in terms of a 5-element ring counter which is capable of counting four input pulses (counting to the base 4), the principles of the invention are applicable to circuits which count any even number of pulses (circuits which count to any even base). In any such case, if there are an even number $n$ of pulses to be counted, the circuit will have $n+1$ stages. Each $i$'th stage, where $i=1, 2 \ldots n, n+1$, in such a circuit receives the complementary output $\bar{z}_{(i\ominus 1)}$ of the $i\ominus 1$'th stage, it receives also its own uncomplemented output $z_i$ as a second input, and it receives also the pulses $t$ to be counted. The $j$'th stage, where $j$ is a particular integer chosen from among 1 through $n+1$, receives inputs corresponding to those above and receives also as a fourth input the complementary output $\bar{z}_{(j\ominus 3)}$ of the $j\ominus 3$'rd stage.

While for purposes of convenience the various gates with permanent biases are shown to have input terminals to which these biases are applied, it is to be understood that such bias terminals need not be brought out to the "outside world" and in fact need not even be physically present. To illustrate, a 4-input 2, 1, 1, 1 threshold gate having a threshold of 2 is the logical equivalent of the 5-input 2, 2, 1, 1, 1 gate with a threshold of 4 and permanent bias 1 applied to one of the weight 2 input terminals, such as one of the gates 15, 17 and 19 of FIGURE 2. Similarly, a 4-input 1, 1, 1, 1 threshold gate with a threshold of 3 is the logical equivalent of the 5-input gate 18 with permanent bias 0 applied to one input terminal thereof as shown in FIGURE 2. See in this connection the discussion in Dinman Patent No. 3,234,401, issued Feb. 8, 1966. Many other logical equivalents are also possible, as understood by those skilled in this art and it is intended that the claims cover such equivalents.

What is claimed is:

1. A ring counter for counting an even base comprising an odd number of threshold gates, one more than said counting base, said gates being interconnected in a ring, each such gate having a plurality of inputs and at least two outputs, each such gate including means for receiving at one input its own output signal, at a second input a signal indicative of the bit to be counted, and at a third input an output signal from the preceding gate in the ring, and solely one of said gates including means for receiving at one additional input an output signal from the third gate preceding it in the ring.

2. A ring counter as set forth in claim 1, wherein the two signals produced by each gate comprise an uncomplemented output signal and a complemented output signal, and each gate receiving at its one input its own uncomplemented output signal, and at its third input the complemented output signal from the preceding gate in the ring, and in which the last-mentioned gate receives as said additional input the complemented output signal from the third gate preceding it in the ring.

3. In a ring counter as set forth in claim 2, the last-named gate comprising a 5-input threshold gate and further including means for applying a permanent bias 0 to one of its inputs, and the remaining gates all comprising 3-input majority-minority gates.

4. In a ring counter as set forth in claim 2, all gates other than said last gate comprising 5-input threshold gates having input weights 2, 2, 1, 1, 1 and a threshold of 4 and further including means for applying a permanent bias representing a binary digit of given value to one of the weight 2 input terminals to each gate and a reset signal to the other weight 2 input terminal thereof which can represent either binary value, said last-mentioned gate also comprising a 5-input threshold gate.

5. In a ring counter as set forth in claim 4, said last-mentioned gate comprising a 5-input majority-minority gate and further including means for applying a bias signal representing the bit 0 to the fifth input thereof.

6. In a ring counter as set forth in claim 4, said last-mentioned gate also comprising a 5-input threshold gate having input weights 2, 2, 1, 1, 1 and a threshold of 4 and further including means for applying a permanent bias representing the bit 0 to a weight 1 input terminal thereof, the pulse to be counted to a weight 2 input terminal thereof, the complementary output signal from the third gate preceding it in the ring to a weight 1 input terminal thereof, the complementary output signal from the preceding gate in the ring to a weight 1 input terminal thereof, and its own uncomplemented output signal to a weight 2 input terminal thereof.

7. In a ring counter as set forth in claim 4, said last-mentioned gate also comprising a 5-input threshold gate having input weights 2, 2, 1, 1, 1 and a threshold of 4 and further including means for applying a permanent bias representing the bit 0 to a weight 1 input terminal thereof, the pulse to be counted to a weight 1 input terminal thereof, the complementary output signal from the third gate preceding it in the ring to a weight 2 input terminal thereof, the complementary output signal from the preceding gate in the ring to a weight 1 input terminal thereof, and its own uncomplemented output signal to a weight 2 input terminal thereof.

8. In a ring counter as set forth in claim 4, said last-mentioned gate also comprising a 5-input threshold gate having input weights 2, 2, 1, 1, 1 and a threshold of 4 and further including means for applying a permanent bias representing the bit 0 to a weight 2 input terminal thereof, the pulse to be counted to a weight 1 input terminal thereof, the complementary output signal from the third gate preceding it in the ring to a weight 1 input terminal thereof, the complementary output signal from the preceding gate in the ring to a weight 2 input terminal thereof, and its own uncomplemented output signal to a weight 1 input terminal thereof.

9. The ring counter set forth in claim 1, wherein each *i*th gate other than the last-mentioned gate realizes the logical function $Z_i = Maj(\bar{z}_{(i \ominus 1)}, z_i, t)$ and the last-mentioned gate includes in its operation a realization of the function $Z_j$ specified in the following table:

TABLE II

| $z_j$ | $\bar{z}_{(j\ominus 1)}$ | $t$ | $\bar{z}_{(j\ominus 3)}$ | $Z_j$ |
|---|---|---|---|---|
| 0 | 1 | 0 | 1 | 0 |
| 0 | 1 | 0 | 0 | 0 |
| 0 | 1 | 1 | 1 | 1 |
| 0 | 1 | 1 | 0 | 0 |
| 0 | 0 | 0 | 1 | 0 |
| 0 | 0 | 0 | 0 | 0 |
| 0 | 0 | 1 | 1 | 0 |
| 0 | 0 | 1 | 0 | 0 |
| 1 | 1 | 0 | 1 | 1 |
| 1 | 1 | 0 | 0 | 0 |
| 1 | 1 | 1 | 1 | 1 |
| 1 | 1 | 1 | 0 | 1 |

where:

$z_i$ represents an output signal produced by the *i*th gate;
$\bar{z}_{(i\ominus 1)}$ represents a complementary output signal produced by the $i\ominus 1$th gate;
$\bar{z}_{(j\ominus 3)}$ represents a complementary output signal produced by the $j\ominus 3$rd gate;
$\bar{z}_{(j\ominus 1)}$ represents a complementary output signal produced by the $j\ominus 1$th gate;
$z_j$ represents an output signal produced by the *j*th gate;
$t$ represents a signal indicative of a bit to be counted;
$i = 1, 2 \ldots n, n+1$;
$j$ = a particular one of 1 through $n+1$;
$\ominus$ represents modulo $n+1$ subtraction; and
$n$ is the counting base.

References Cited

UNITED STATES PATENTS

| | | | |
|---|---|---|---|
| 3,234,401 | 2/1966 | Dinman | 307—211 |
| 3,253,158 | 5/1966 | Horgan | 307—223 |

JOHN S. HEYMAN, *Primary Examiner.*

U.S. Cl. X.R.

307—211, 223